May 26, 1931.     J. W. SMITH     1,807,094
SPRING END CONNECTION
Filed Nov. 3, 1928
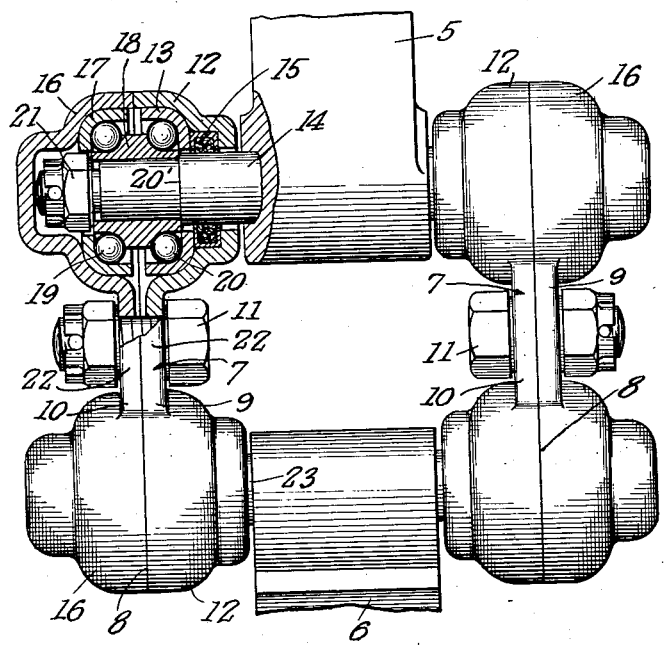
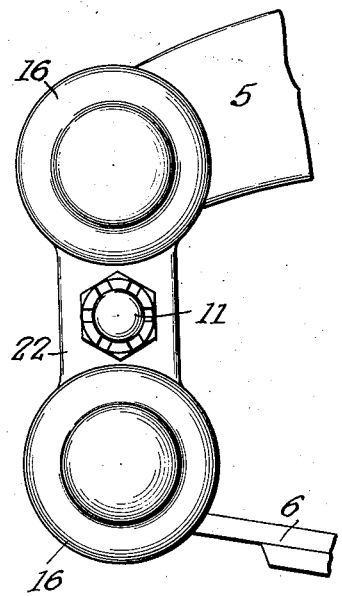
INVENTOR
John W. Smith
BY
ATTORNEYS Patented May 26, 1931

1,807,094

UNITED STATES PATENT OFFICE

JOHN W. SMITH, OF NEW BRITAIN, CONNECTICUT, ASSIGNOR TO THE FAFNIR BEARING COMPANY, OF NEW BRITAIN, CONNECTICUT, A CORPORATION OF CONNECTICUT

SPRING END CONNECTION

Application filed November 3, 1928. Serial No. 316,890.

My invention relates to a spring end connection for connecting the frame and spring of a motor vehicle.

It is an object of the invention to provide an antifriction spring shackle construction in which the connecting shackle members at opposite sides of a spring and frame may be wholly independent of each other.

It is another object to provide a spring end connection in which double row angular contact antifriction bearings may be readily employed.

Other objects will appear as the specification proceeds.

Briefly stated, in a preferred form of the invention I provide shackle members independent of each other at opposite sides of the spring and frame. Each shackle member is divided longitudinally, that is, formed in two parts, each part of which preferably has therein a part of a bearing housing. The two shackle links forming each shackle member are preferably secured together in abutting relation to each other. Anti-friction bearing members preferably in two separate rows are located in the bearing housings, and means, such as pins, carried by the spring and frame, extend into said housings and are provided with raceways to engage the double row of intifriction bearing members in said housing. Shackle members at opposite sides of the spring and frame each act independently and are not connected together.

In the drawings which show, for illustrative purposes only, a preferred form of the invention as embodied in a shackle construction—

Fig. 1. is a rear view of a spring and frame connected by a shackle construction, illustrating features of the invention, parts being shown in section for purposes of illustration;

Fig. 2 is a view in side elevation of parts shown in Fig. 1.

In said drawings, 5 indicates a vehicle frame, while 6 indicates a spring to be connected thereto. The spring and frame are connected at opposite sides by shackle members 7—7, which act independently of each other, and are not connected together. Since these shackle members are preferably duplicates of each other, and since each shackle member is preferably symmetrical, that is to say, the same on each end, a description of one of the shackle members will suffice for both, and a description of one end as shown in section may be regarded as typical of the construction at the opposite end of said shackle member.

As shown, each shackle member 7 is divided longitudinally along a plane indicated at 8, that is to say, each shackle member is formed of two parts 9—10 secured together by means such as a through bolt 11. The link part 9 is provided with a bearing housing 12 for receiving one raceway 13 of an antifriction bearing member. The bottom of each housing recess 12 is apertured to permit passage of means such as a pin 14 secured to the frame and having formed thereon or carrying antifriction bearing member raceways, as will be later described. Suitable means, such as a dust ring 15, serves to seal the space between the pin 14 and the annular space about the pin.

The link member 10 is provided with a housing member 16 at each end for the reception of an antifriction bearing member raceway 17 arranged oppositely to the corresponding raceway 13. The pin 14 may carry a raceway member 18 having spaced apart raceways thereon complementary to the raceways 13 and 17. These raceways are preferably inclined to each other so that with the double row of balls 19—20 a double row angular contact bearing is formed. The race ring 18 may fit the pin 14 and abut a shoulder 20 thereon, and may be held in place by means of a nut 21 threaded upon the projecting end of the pin 14.

The portions of each link intermediate the housings 12—12 and 16—16 may be provided with strengthening flanges 22—22, which serve to stiffen the links, and which may abut each other. It will thus be seen that, with the links 9—10 abutting each other, the bearings will be completely enclosed. If desired, a suitable gasket may be interposed between the abutting portions of the links 9—10 for the purpose of assuring a tight joint.

The spring 6 is provided with means such as a pin 23, which may correspond in all respects to the pin 14 and be supported in the lower housings 12—16 on the links.

In assembling, the link 9 is first slipped over the ends of the pins 14—23. The inner raceway member 18 is then put on after the inner row of antifriction bearing members 20 is in place. The nut 20 is then turned up to secure the bearing ring 18 in place. The outer link 10 is then put in place after the balls 19 have been interposed between the raceways, after which the bolts, such as 11, are applied and serve to hold the links together and the entire shackle member in assembled relation. The shackle member at the opposite side of the spring and frame may be a duplicate of that heretofore described, and no separate description thereof need be given.

It will be seen that by means of my improved construction I may employ antifriction spring shackles which are wholly independent of each other. The use of double row angular contact bearings is much facilitated by means of my construction, and such double row bearings impart the required stiffness to the two independently acting shackle members. Both radial and end thrust loads are taken by the antifriction bearing members such as the balls, and there are substantially no rubbing parts to cause squeaks. Substantial space is provided about the bearing members to permit the retention of a large supply of lubricant. The parts may be made relatively cheaply, and, as shown, the link members are formed of pressed metal. By proper care in manufacturing, the bearing members 19—20 will have just the desired fit with their respective raceways when the shackle links are in contact with each other. Thus, parts may be made readily interchangeable, and no adjustments are required to secure the desired fit.

While the invention has been described in considerable detail, I do not wish to be strictly limited to the form shown, since changes may be made within the scope of the invention as defined in the appended claims.

I claim:

1. In a spring end connection for connecting a frame and spring of a motor vehicle, shackle members independent of each other, each of said shackle members being provided with a bearing housing at opposite ends thereof, said shackle members being divided longitudinally and separable along the longitudinal line of division and means for detachably securing said separable parts of each link together.

2. In a spring end connection, bearing pin means having spaced apart opposed inner raceways thereon, antifriction bearing members on said raceways, and two separable raceway supporting members secured together and each having an antifriction bearing member raceway complementary to said raceways on said pin means, for the purpose described, said pin end being housed in the space between said separable members.

3. In a spring end connection, means for connecting a spring and frame including independent shackle members at opposite sides of said spring and frame, each of said shackle members including two links having antifriction bearing housing means at opposite ends thereof, said two links being secured together in abutting relation to each other, antifriction bearing members in said bearing housings, and means carried by said spring and frame and supported by said antifriction bearing members.

4. In a spring shackle construction, a pin to be secured to a frame and project from opposite sides thereof, a second pin to be secured to a spring and project from opposite sides thereof, independent shackle members connecting the ends of the pins carried by said spring and frame, each of said shackle members including two-part separable links and means for detachably securing said separable links together, and antifriction bearing members interposed between said links and said projecting pin ends.

5. A shackle link for an antifriction shackle construction, including a link member having closed depressed bearing recesses at opposite ends thereof, a complementary link having bearing recesses at opposite ends thereof complementary to said first mentioned bearing recesses, said last mentioned link member having openings in the bottom of the bearing recesses, and means for securing said link members together and sustaining an antifriction bearing in the complementary bearing recesses in said two links.

6. In a spring shackle construction, a shackle member formed in two parts, each having complementary circular bearing recesses therein, means for securing said two parts of said shackle member together in abutting relation to each other, and an antifriction bearing in each bearing recess formed by the complementary bearing recesses in said two shackle parts, the bearing recesses in one of said parts being closed and the recesses in the other of said parts having an opening in the bottom thereof.

7. In a spring shackle construction, a pin to be carried by a frame, a second pin to be carried by a spring, an antifriction bearing at each end of each said pin, a shackle member including two plates having complementary recesses therein for enclosing one bearing on the frame pin and one bearing on the spring pin, means for detachably securing the plates of said shackle member together, and a duplicate two-part shackle member for connecting the opposite bearings on said frame pin and spring pin.

8. In a spring end connection, a pin, a double row angular contact bearing at each end of said pin, independent two-part shackle links enclosing the pin ends and bearings at each end of said pin, and means for detachably holding the two parts of said shackle links together at each end of said pin.

9. In a spring shackle construction, a pin to be secured to a frame member and project at opposite sides thereof, bearing raceway means rigidly secured to said projecting pin ends, a pin to be secured to a spring and project from opposite sides thereof, bearing raceway members rigidly secured to said last mentioned pin ends, shackle members for connecting the corresponding ends of said pins on said frame and spring, each of said shackle members including a link member having a closed bearing recess therein at each end, and a second link member having a complementary bearing recess at each end, said last mentioned recesses having openings in the bottom thereof for the passage of said projecting pin ends, anti-friction bearing members engaging said raceways and housed within the space formed by said complementary bearing recesses, and means for securing said links to each other, said shackle members being entirely independent of each other except for connection to said pins.

JOHN W. SMITH.